United States Patent [19]

Rinehart

[11] Patent Number: 5,015,514

[45] Date of Patent: May 14, 1991

[54] PULTRUDED OR FILAMENT WOUND SYNTHETIC RESIN FUSE TUBE

[75] Inventor: William M. Rinehart, Centralia, Mo.

[73] Assignee: A. B. Chance Company, Centralia, Mo.

[21] Appl. No.: 382,676

[22] PCT Filed: Aug. 17, 1988

[86] PCT Filed: PCT/US88/02824

§ 371 Date: Jul. 7, 1989

§ 102(e) Date: Jul. 7, 1989

[87] PCT Pub. No.: WO89/01697

PCT Pub. Date: Feb. 23, 1989

[51] Int. Cl.[5] ........................ B32B 1/08; H01H 85/38

[52] U.S. Cl. ................................ 428/36.4; 428/36.91; 138/140; 138/153; 138/172; 337/186; 337/246; 337/273; 337/276; 337/414

[58] Field of Search .................... 428/36.91, 36.4, 500, 428/212; 138/140, 153, 172; 337/142, 186, 246, 273, 414, 415, 276

[56] References Cited

U.S. PATENT DOCUMENTS

| | | | |
|---|---|---|---|
| 4,074,220 | 2/1978 | Santilli | 337/276 |
| 4,349,803 | 9/1982 | Tobin | 337/186 |
| 4,373,555 | 2/1983 | Mattuck et al. | 138/140 |
| 4,520,337 | 5/1985 | Cameron . | 337/275 |
| 4,709,222 | 11/1987 | Morita et al. | 337/273 |
| 4,713,645 | 12/1987 | Razavi | 337/246 |

*Primary Examiner*—Ellis P. Robinson
*Assistant Examiner*—Donald J. Loney
*Attorney, Agent, or Firm*—Hovey, Williams, Timmons & Collins

[57] ABSTRACT

Improved arc-suppressing fuse tubes of the type used in electrical cutouts is provided which includes a fluid epoxy resin matrix core designed, upon experiencing high temperature arcing conditions, to generate sufficient moisture and arc-suppressing gases to safely and efficiently interrupt an arc. The fuse tubes of the invention completely eliminate the use of expensive and difficult to fabricate bone fiber conventionally used in fuse tubes of this type. The preferred fuse tube construction is an integrated, synthetic resin body having an outer tubular shell including an epoxy fiberglass-reinforced synthetic resin matrix, together with an inner tubular arc-suppressing core having an epoxy resin matrix with respective quantities of an organic fiber and an inorganic filler therein. An anhydride curing agent for the epoxy is incorporated at an anhydride to epoxide ratio from about 1.0 to 1.4:1. The filler, aluminum trihydrate, make up 40% to 80% by weight of the inner core and is operable to generate copious amounts of molecular water under arcing conditions. The organic fiber, present in an amount of from 5% to 30% by volume of the core, is either polyester or polyester plus rayon and provides a degree of structural reinforcement for the core during manufacturing. The fiber also aids in arc-suppression through the evolution of gaseous products. The fuse tubes of the invention may be pultruded as integrated, joint-free bodies of any convenient length.

11 Claims, No Drawings

PULTRUDED OR FILAMENT WOUND SYNTHETIC RESIN FUSE TUBE

BACKGROUND OF THE INVENTION

1. Field of the Invention

The present invention is broadly concerned with improved, relatively low cost, synthetic resin-based arc-quenching fuse link tubes adapted for use with electrical cutouts or other similar equipment and which serve, under fault current-induced arcing conditions when the fuse link melts, to suppress the arc and thereby clear the fault. More particularly, it is concerned with such improved arc-quenching fuse tubes which include an inner wall segment formed of arc-quenching material, preferably comprised of an epoxy synthetic resin formulation, e.g. bis-phenol epoxy (BPA) or cycloaliphatic epoxy impregnated with an inorganic filler which generates molecular water upon being subjected to arcing conditions. The epoxy matrix is reinforced by provision of an organic fiber such as polyester, rayon or mixtures thereof that supports the resin during cure and contributes to arc interruption. The synthetic resin-based fuse tubes in accordance with the invention completely eliminate the use of conventional bone fiber as a lining material for fuse tubes, while at the same time giving equivalent or even enhanced arc-quenching results, as compared with bone fiber.

2. Description of the Prior Art

The use of so-called bone fiber as a lining material for expulsion fuse tubes is well-established. The arc-interrupting operation of bone fiber in this context results from the fact that the material is a high density, cellulosic, exceptionally strong, resilient material which becomes a charring ablator in the presence of an electric arc. As bone fiber decomposes under the intense arc heat, a char of carbonaceous material is formed in the tube, along with simultaneous production of a number of insulating and cooling gases. The exceptionally low thermal conductivity of the char layer protects the virgin bone fiber from excessive ablation hence rendering the tube reusable. The bone fiber is also somewhat hydrophilic in nature and the adsorbed water is also subject to decomposition to provide gaseous arc-interrupting products. The presence of the evolved gases, along with their turbulent intermixing with the arc, usually leads to a successful circuit interruption. It has been reported that over 90% of the decomposition gases from bone fiber consist of hydrogen and carbon monoxide. These materials are formed by a highly endothermic reaction of carbon with the water present in the bone fiber. Hence, it will be appreciated that the water content of the bone fiber not only provides endothermic cooling by evaporation, but also reacts with carbon to form arc extinguishing gases in the form of carbon monoxide and hydrogen.

As noted, an important characteristic of bone fiber is its tendency to absorb water; however, if atmospheric conditions are either too dry or too humid, the interrupting capability of bone fiber may be adversely affected. Hence, bone fiber is subject to an inherent variability depending in large measure upon uncontrollable ambient conditions.

The carbonaceous char formed when bone fiber interrupts an arc also acts as a thermal barrier to prevent excessive ablation of the bone fiber surface. Such ablation is controlled to a certain extent by the endothermic events associated with the presence of a significant quantity of water, i.e., evaporation and reaction with carbon The carbonaceous char layer must not, however, be too heavy or it will cause a restrike. As the moisture content in bone fiber goes down, more of the arcing energy is available for char formation, and hence the probability of a restrike increases.

While the use and operational efficiency of bone fiber is thus well known, a number of severe problems remain. In the first place, bone fiber is in short supply; only two reliable remain in the market and how long they will continue to do so is unknown The material is difficult and time-consuming to make, and therefore is costly. Furthermore, it is produced only in certain standard lengths, and this inevitably means that there is substantial wastage when the tube lengths are cut for tube fabrication purposes.

In addition, a completed fuse tube employing bone fiber typically comprises an outer synthetic resin reinforced shell with the bone fiber secured to the inner portions thereof as a liner. It is sometimes very difficult to properly adhere the bone fiber to the outer shell, and in most cases a weak mechanical bond is the best that can be accomplished.

Finally, it has been established that the expulsion forces generated by bone fiber during an arc interruption are considerable, and this in turn requires that the fuse assembly hardware holding the tube be relatively massive and hence expensive.

All of these drawbacks have made it clear that there is a real need in the art for an adequate replacement for bone fiber in the construction of arc-quenching fuse tubes.

Although there have been prior efforts to provide synthetic resin substitutes for bone fiber fuse tubes, the solutions suggested have not found significant commercial acceptance.

Canadian General Electric Company Limited has addressed the problem as discussed in Mattuck and Conte U.S. Pat. Nos. 4,373,555 and Bergh U.S. Pat. No. 4,373,556. Both patents describe a cutout fuse tube in which a cycloaliphatic epoxy core is reinforced with polyester fiber to aid in arcquenching. The polyester fiber content is described as being at least about 45% by weight. The outer shell is either a cycloaliphatic or BPA epoxy formulation. Mattuck, et al. suggest that heat treating the polyester fiber may improve the mechanical and electrical characteristics of a fuse tube. The '555 patent to Mattuck, et al. also indicates that the composition may contain aluminum trihydrate (ATH) as a flame retardant. The concentration of ATH is limited to no more than about 15% by weight based on the minimum resin and polyester constituents that must be provided to satisfy the requirements of the patentees' system. Although described as a flame retardant, ATH at that concentration would have very limited flame suppression characteristics and would contribute very little, if any, to arc extinguishment.

Tobin in U.S. Pat. No. 4,349,803 discusses a fuse tube made from a cycloaliphatic epoxy resin that incorporates a melamine or dicyandiamide as an arc-extinguishing filler. Also the patentee teaches reinforcing the interface between the core and shell glass cloth, mat or strands under conditions such that the core and shell agents are said to flow into the reinforcing material during pressure gelation.

SUMMARY OF THE INVENTION

The present invention overcomes the heretofore unsolved problem of providing an epoxy resin based fuse tube which has enhanced arc-quenching properties while exhibiting superior resistance to erosion during interruption. As a result, the synthetic resin fuse tube has a significantly longer interrupting cycle life than existing resin fuse tubes. The synthetic resin matrix making up the improved fuse tube of this invention also incorporates a higher proportion of aluminum trihydrate (ATH) than heretofore deemed desirable. The ATH serves the dual function of decreasing the cost of the fuse tube but more importantly contributes molecular water to the interruption process which not only provide gaseous products to assist in arc-interruption but also lowers the temperature of the interruption gases to decrease heat degradation of the tube wall which would adversely affect fuse tube longevity. An organic fiber in the nature of a polyester or the like is added to the resin formulation not only for the purpose of supporting the base resin system until it cures to self-sustaining form, but also to furnish additional gaseous products which assist in the arc-extinguishing process. When rayon is included as an organic fiber, the hydrophilic nature thereof contributes additional molecular water for arc-extinguishing enhancement.

The shell of the fuse tube as well as the core thereof may be fabricated of either cycloaliphatic or BPA epoxy resins, with the core and shell of different epoxy resins, or of the same type. The anhydride used to effect curing of the core resin should be higher than that normally recommended and preferably present in a concentration such that the anhydride to epoxy ratio on the basis of anhydride equivalents to epoxy equivalents is at least about 1.0 to 1.4:1. The ATH filler incorporated in the resin making up the core should be in the range of about 40% to about 80% on a weight basis of the total weight of the composition. Best results are obtained when an additional additive such as rayon is added to the formulation with the ratio of polyester fiber to rayon fiber being about 2:1 on a weight basis.

Advantageously, the fuse tubes of the invention are formed with an outer tubular shell including an epoxy resin matrix reinforced with a fiber such as fiberglass. The inner tubular core disposed within the shell defines the arc-suppressing region of the tube. The core most preferably comprises a thermosetting synthetic resin matrix such as a cycloaliphatic or BPA epoxy with respective quantities of the organic fiber and the filler therein. During manufacture of the shell and core, the resins are at least partially intermixed and are interreacted and cured together. In this fashion, the completed tube presents a joint-free body with an intimate fusion between the shell and core portions. In practice, it is contemplated that the fuse tube will be manufactured using pultrusion techniques in order to give a continuous, joint-free structure. In this context, the organic fiber of the preferred core system holds the latter in place during curing. In the outer shell portion, inorganic fiberglass fiber is preferred for reasons of strength.

While pultrusion production is believed to be the most efficient from a commercial point of view, those skilled in the art will understand that fuse tubes in accordance with the invention can be produced by a variety of other methods, such as filament winding or casting.

DESCRIPTION OF THE PREFERRED EMBODIMENTS

As indicated above, the fuse tubes of the present invention are in the form of elongated, tubular bodies each having an inner core section and an outer shell section. The core section is made up of an organic synthetic resin matrix selected from the group consisting of the cycloaliphatic and BPA epoxy resins and mixtures thereof. BPA epoxy is the most preferred core resin. The purpose of the resin in the core is to hold and bond to the reinforcing fiber and fillers preferably employed therein, to supply organic material which in turn will generate arc-quenching gases, and to mix and react with the resin of the shell portion in order to give a fused, integrated tubular body. In view of the fact that the core resin should be chemically similar to that used in the shell, it is apparent that inorganic or semiorganic silane resins are not preferred as the core resin matrix. These silanes are known for their heat resistance, and therefore it is believed that they would not be as effective for arc-suppression.

Reactive diluents may be used in the core resin system to lower the viscosity thereof and thereby allow higher filler loadings along with efficient organic fiber wetout. Such reactive are known. For example, in epoxy resin systems, diluents such as butyl glycidyl ether, neopentyl glycol diglycidyl ether, vinyl cyclohexene dioxide (VCD) are useful. Such diluents are generally present at a level of up to 20% by volume in the core matrix.

The core matrix also contains a substantial amount of aluminum trihydrate (ATH, i.e. hydrated aluminum) filler which is capable of generating molecular water under arcing conditions within the tube. The filler is generally present at a level of from about 40% to about 80% by weight of the core resin system, more preferably about 45% to 70% by weight, and usually present in an amount of about 55% to 60% by weight.

Hydrated alumina (ATH) is well suited as a water source in the core resin system. The water of hydration is sufficiently bound so as to not cause problems during normal curing temperatures (e.g., 300° F.), but is released when needed at relatively high arcing temperatures. The preferred ATH filler contains about 35% by weight of water which is not released until temperature conditions of at least about 300° C. are reached.

It has also been found that improved results are obtained if a stoichiometric excess of the anhydride hardener is used for the core epoxy resin of the fuse tube. The anhydride to epoxy ratio may be expressed using the formulas below based on parts of anhydride by weight per hundred parts of resin:

$$\text{Anhydride Equivalents} = \frac{\text{Grams of Anhydride}}{\text{Anhydride Equivalent Weight}}$$

$$\text{Epoxy Equivalents} = \frac{\text{Grams of Epoxy}}{\text{Epoxy Equivalent Weight}}$$

$$\text{Anhydride/Epoxy Ratio} = \frac{\text{Anhydride Equivalents}}{\text{Epoxy Equivalents}}$$

When the preferred BPA epoxy resin is used for fabrication of the fuse tube core, best results are obtained when the anhydride to epoxy ratio is maintained at a level of at least about 1.2:1. The ratio may be somewhat lower, i.e., about 1.0 to 1.1:1 when the less preferred cycloaliphatic epoxy resin is employed as the core matrix material.

Epoxy groups react not only with the anhydride but with OH groups present in the epoxy molecule. As a consequence, it is generally recommended that less than a theoretical stoichiometric amount of anhydride be used for hardening of the epoxy because of the internal reactions that are known to take place. It is contrary to general practice to use a 20% greater anhydride to epoxide ratio because to do so would normally result in a deterioration of the product. It is accepted thought that the greater the anhydride ratio, the poorer the properties of the resulting epoxy resin. This is attributable to the fact that each time an epoxy radical reacts with an anhydride, an ester group is formed. The ester group is known to be the weakest chemical group in organic chemistry. A molecule therefore breaks first at the ester linkage. Furthermore, an ester linkage can be broken by almost any kind of stress whether it be UV, heat, electrical, or chemical in nature. This is the reason polyesters are not as strong as epoxies; a polyester may have 20% to 50% ester groups in its backbone whereas an epoxy contains only 7% to 8% esters in the backbone. However, the ester composition of an epoxy is increased with a concomitant lessening of the ester linkage stress resistance of the epoxy when the anhydride equivalent to epoxide equivalent ratio exceeds the minimum amount required to effect hardening of the resin.

However, in the present instance wherein there is a need to provide a core for a fuse tube which will rapidly and efficiently suppress an arc while at the same time be sufficiently resistant to erosion so as to have a long useful life, it has been found that the desired result can be obtained by using a greater than recommended amount of anhydride for curing of the epoxy, even though to do so increases the ester linkages in the core material. The first reaction that occurs when the arc interrupts is depolymerization of the core organic material. It is preferred that the depolymerization take place primarily as small molecular groups rather than large molecular entities. It is believed that the size of the molecular groups that break away from the tube wall and enter the arc plasma is determined largely by the anhydride equivalent to epoxide equivalent ratio. The smaller the molecular groups resulting from the depolymerization, the more energetic they are in the arc interruption process because of the greater incorporation of such groups into the plasma and the faster such incorporation takes place. These molecular fragments subjected to decomposition by the heat of the arc plasma make carbon available for reaction with molecular water furnished by the filler and from water contained in hydrophilic fibers making up a part of the inner core. The water-carbon reaction which takes place necessarily causes erosion of the inner surface of the tube core. The promotion of smaller organic resin fragments and the assurance of adequate water to quickly react therewith causes the surface of the core material exposed to the arc to be more rapidly erodable than would otherwise be the case, thereby cutting down on the total amount of erosion.

This seemingly antithetical result is theorized to occur because of the fact that two distinct reactions are taking place at the same time. One is the depolymerization or decomposition of the epoxy polymer which produces proportionately smaller molecular fragments; the second reaction is water split off from the ATH and furnished by the rayon fibers. Water reacting with carbon from the molecular fragments produces hydrogen gas and carbon monoxide under high pressures which expand rapidly and extinguish the arc. All of this occurs at a sufficiently rapid rate that the arc is extinguished so early in the event that overall erosion of the core material is significantly decreased. Consequently, a faster erosion rate cuts down the total amount of erosion.

The supplemental organic fiber added to the core resin system is selected from the group consisting of polyester, rayon, acrylic, nylon, cotton and mixtures thereof The fiber is generally present at a level of from about 5% to 30% by volume in the core system, and most preferably at a level of about 13% by volume of fiber therein.

Although the purpose of the organic fiber in the core is principally to hold the uncured resin in place during the curing process, the fiber also provides a certain amount of carbon for reaction with water during the arc-quenching function of the core. Typically, organic fibers in the core will be present at a level of from about 5% to 30% by volume of the core system, for tubes produced by filament winding or pultrusion processes. Furthermore, materials such as rayon and cotton are cellulosic in nature and therefore are very hydrophilic. These additives, therefore, contribute water for reaction with carbon to form arc extinguishing gases.

Inorganic fibers such as fiberglass actually inhibit the arc-quenching function of the core, although it may be used in moderate amounts in the core in conjunction with other more efficient arc extinguishers. Glass fibers may be used in this context because of their relatively low cost and strength properties.

The epoxy resin of the shell portion of the fuse tubes of the invention serves to hold and bond to the reinforcing fiber of the shell and to form a composite with sufficient stiffness and burst strength to withstand the forces of arc interruption. Also, it is very advantageous to select a shell resin system which forms an integrated, fused body with the resin system of the core. Epoxy resins are therefore well suited for use in the shell portions of the fuse tubes of the invention. Cycloaliphatic and BPA epoxy resins available from a variety of suppliers are especially well suited for use in the shell portion and the fuse tubes of the invention. The anhydride cured epoxies are of particular interest because of their high strength, long pot life and moderate costs. In such shell systems, the anhydrides would normally be used at an anhydride/epoxide equivalent ratio of from about 0.85 to 1.0. Anhydrides such as hexahydropthalic anhydride, tetrahydrophthalic anhydride, methylhexahydrophtalic anhydride, methyltetrahydropthalic anhydride and various blends thereof are preferred. To aid in the cure of these anhydride-epoxy systems, an accelerator may be added such as benzodimethyl amine, 2,4,6-tris (dimethylamino methyl) phenol, the $BF_3$ complexes or the like. The level of accelerator in the shell system varies with the accelerator type and the desired speed of cure.

Fiberglass roving is the material of choice for use in reinforcing the shell matrix system. Any one of a number of commercially available fiberglass fibers could be used in this context.

In a preferred embodiment of the invention, the outer diameter of the core is nominally ¾ inch, the OD of the overall tube is about 1 inch and the internal passage therethrough is about ½ inch.

EXAMPLES

The following examples describe the construction and testing of a number of fuse tubes in accordance with the invention. It is to be understood that these examples are presented by way of illustration only, and nothing therein should be taken as a limitation upon the overall scope of the invention.

A number of test fuse tubes were constructed in the laboratory. In each instance, a ½ inch diameter polished steel winding mandrel having the outer surface thereof coated with a release agent was employed, and respective inner core and outer shell portions of the completed tubes were wound on the mandrel. Specifically, in each case, a core fiber was first passed through a quantity of the selected core synthetic resin formulation, whereupon it was wound onto the mandrel. Thereafter, the shell fiber (i.e., fiberglass) was passed through the shell synthetic resin formulation, and was then wound over the previously deposited, resin-impregnated core fiber. The doubly wound product was then cured at 300° F. for a period of one hour in order to form a fused, integrated tubular body. The outer diameter of the core section in each case was about 0.78 inch, whereas the outer diameter of the finished product was about 1 inch.

The cured tubular fuse tubes were then removed from the mandrel and a conventional aluminum-bronze tubular fuse tube casting was inserted into the upper ends of the test tubes. At this point, 6 amp fuse links were installed by passing the same upwardly through the fuse tubes until the washer element carried by the links engaged the bottom open ends of the tubes. The upper ends of the tubes were then closed using a standard threaded fuse link cap which also served to secure the fuse links within the tubes.

The completed fuse assemblies were then tested by individually placing them in an inverted condition (i.e., casting end down) and attaching them to a compression strain gauge. The fuse link in each case was then electrically coupled to a high amperage source, and the link was severed by passing a fault level current (5,000 amps AC) through the link. This resulted in creation of high temperature arcing conditions within the test tubes, and the arc-quenching characteristics of the respective tubes were measured by determining the number of cycles required to achieve complete interruption. Each test tube was then re-fused and retested for a total of three interruptions.

EXAMPLE 1

In this Example, various organic fibers were employed in the cores of the test tubes in order to determine the arc interrupting capability of the fibers. In each case, the core synthetic resin formulation contained 75 parts by weight Epon 828 BPA epoxy resin (Shell Chemical Co.); 25 parts by weight of neopentyl glycol diglycidyl ether reactive diluent commercialized under the designation WC-68 by Wilmington Chemical Co.; 92.7 parts by weight of methyl hexa, methyl tetra, tetra and hexahydrophthalic anhydride blend sold by the ArChem Company of Houston, Tex. under the designation ECA 100 h; 1.4 parts by weight of DMP-30 anhydride accelerator (2,4,6-tris (dimethylamino methyl) phenol) sold by Rohm & Haas Chemical Co.; 4.0 parts by weight of gray paste coloring agent; 1.0 parts by weight of a air release agent sold by BYK Chemie USA under the designation Byk-070; and 243.3 parts by weight of hydrated alumina (AC-450 sold by Aluchem Inc.). These materials were mixed in the conventional fashion to obtain a flowable epoxy formulation which gave a 55% by weight hydrated alumina filled formulation with an anhydride to epoxide ratio of 1.0.

The selected core fiber for each test tube was then run through the above described core resin formulation, and hand wound onto the mandrel. The core fibers employed were interlaced polyester (745 yards per pound), interlaced rayon (617 yards per pound), interlaced nylon (624 yards per pound), spun cotton (795 yards per pound), interlaced acrylic (636 yards per pound) and spun acrylic (1,486 yards per pound). These fibers were obtained from Coats & Clark, Inc. of Toccoa, Ga.

The shell portion of the test tubes was then applied directly over the resin-impregnated core fiber. In each instance, the shell resin contained 100 parts by weight Epon 828; 80 parts by weight of ECA 100 h; 1.2 parts by weight of DMP-30 accelerator; and 3.6 parts by weight of gray paste. The shell fiber was standard fiberglass roving commercialized under the name Hybon 2063 by PPG Industries. As described previously, the fiberglass roving was first passed through the shell resin whereupon the impregnated roving was wound onto the mandrel atop the core portion.

The results from the interruption tests with each of the test tubes are set forth in the following table:

TABLE I

| Sample | Fiber | Cycles to Interrupt | | |
|---|---|---|---|---|
| Number | In Core | Shot 1 | Shot 2 | Shot 3 |
| 1 | Nylon | — | ½ | 1 |
| 2 | Cotton | ½ | — | — |
| 3 | Acrylic | 1 | 3 | — |
| 4 | Rayon | ½ | ½ | ½ |
| 5 | Polyester | 1 ½ | ½ | 2 |
| 6 | Glass | Did not clear - no interruption | | |

These results demonstrate that the use of the various organic fibers in conjunction with a hydrated alumina-filled core resin formulation give acceptable arc interruption. The use of fiberglass in the core, however, yields an unacceptable fuse tube. It is believed that the presence of the inorganic fiberglass in the core interferes with the generation of requisite quantities of arc-suppressing gases within the tube.

EXAMPLE 2

In this Example, three separate test tube constructions were fabricated, with a replicate being made in each case for a total of six test tubes. The core resin formulation with respect to Samples 7 and 7a included 75 parts by weight Epon 828; 25 parts by weight of WC-68; 92.7 parts by weight of ECA 100 h; 1.4 parts by weight of DMP-30; 4.0 parts by weight gray paste; 1.0 parts by weight of Byk 070; and 243.3 parts by weight of chemically modified hydrated alumina sold by Solem Industries of Norcross, Ga. under the designation SB-36CM. The formulation had an anhydride to epoxide ratio of 1.0.

The core resin for Samples 8 and 8a included 75 parts by weight of Epon 828; 25 parts by weight of WC-68; 102.0 parts by weight of ECA 100 h; 1.5 parts by weight of DMP-30; 4.0 parts by weight gray paste; 1.0 parts by weight of Byk 070; and 254.8 parts by weight of AC-450 hydrated alumina. The formulation had an anhydride to epoxide ratio of 1.1.

The core resin for Samples 9 and 9a included 75 parts by weight of Epon 828; 25 parts by weight of WC-68; 111.3 parts by weight of ECA 100 h; 1.7 parts by weight of DMP-30; 4.0 parts by weight gray paste; 1.0 parts by weight of Byk 070; and 266.4 parts by weight of SB-36CM hydrated alumina. The formulation had an anhydride to epoxide ratio of 1.2.

The core fiber in each case was a 2:1 ratio of polyester to rayon. Application of this ratio of core fiber was accomplished by employing two spools of polyester with one spool of rayon, passing the respective fiber leads through the appropriate core resin formulation, and application of the impregnated fiber onto the mandrel.

The shell resin formulation and fiber materials were identical to those described in connection with Example 1, and the method of final fabrication was similarly identical.

The results of this series of tests is set forth in Table II:

TABLE II

| Sample Number | Anhydride/ Epoxide | Cycles to Interrupt Shot 1 | Shot 2 | Shot 3 |
|---|---|---|---|---|
| 7 | 1.0 | 3 | ½ | 1 |
| 7a | 1.0 | ½ | 3 | ½ |
| 8 | 1.1 | ½ | ½ | ½ |
| 8a | 1.1 | 3 | ½ | ½ |
| 9 | 1.2 | ½ | ½ | ½ |
| 9a | 1.2 | ½ | ½ | ½ |

The results of this test show that arc interrupting efficiency may be increased by increasing the anhydride content of the core resin.

EXAMPLE 3

In this series of tests, three separate tubes were fabricated, with a replicate for each tube. The purpose of the test was to demonstrate the effect of a combination of organic fiber and glass fiber in the core portion of the tubes. All core resins formulations were identical and were exactly as set forth with respect to Samples 7 and 7A of Example 2. The fiber portion of the cores are as set forth in Table III, i.e., the rayon/fiberglass ratio was varied from 3:0 to 1:2.

The outer shell portions of the respective test tubes were likewise identical and were fabricated as set forth in connection with Example 1.

The test results from this study are set forth in Table III.

TABLE III

| Sample Number | Rayon/ Glass | Cycles to Interrupt Shot 1 | Shot 2 | Shot 3 |
|---|---|---|---|---|
| 10 | 3/0 | ½ | ½ | ½ |
| 10a | 3/0 | ½ | ½ | ½ |
| 11 | 2/1 | ½ | ½ | ½ |
| 11a | 2/1 | NI[1] | 2 ½ | NI |
| 12 | ½ | NI | ½ | NI |
| 12a | ½ | 1 | NI | ½ |

[1]NI = no interruption

As can be seen from Table III, as the amount of glass is increased in the core portion, interrupting efficiency decreases.

EXAMPLE 4

In this series of tests, four test samples were prepared containing 45% and 50% by weight of hydrated alumina (HA). In particular, Sample 13 had a core resin formulation including 80 parts by weight of Epon 828; 20 parts by weight of vinyl cyclohexene dioxide reactive diluent (VCD); 105 parts by weight of methylhexahydrophthalic anhydride (MHHA); 1.6 parts by weight of DMP-30; 4.0 parts by weight of gray paste; 173.1 parts by weight of hydrated alumina; and 1.0 parts by weight of Byk-070. The resin formulation contained 45% by weight HA.

Sample 14 contained 80 parts by weight of Epon 828; 20 parts by weight of VCD; 105 parts by weight of MHHA; 1.6 parts by weight of DMP-30; 4.0 parts by weight of gray paste; and 260 parts by weight of hydrated alumina. This formulation contained 55.2% by weight HA.

Sample 15 contained 44.5 parts by weight of CY-184; 5.5 parts by weight of VCD; 96.4 parts by weight of MHHA; 1.6 parts by weight of DMP-30; 4.0 parts by weight of gray paste; 166.1 parts by weight of hydrated alumina; and 1.0 parts by weight of Byk070. This formulation contained 45% by weight HA.

The core resin of Sample 16 contained 94.5 parts by weight of cycloaliphatic epoxy resin sold by the Ciba-Geigy Corporation under the designation CY-184; 5.5 parts by weight of VCD; 96.4 parts by weight of MHHA; 1.6 parts by weight of DMP-30; 4.0 parts by weight of gray paste; 249 parts by weight of hydrated alumina; and 1.0 parts by weight of Byk-070. This formulation contained 55.1% by weight HA.

The shell resin consisted of 100 parts by weight of Epon 828; 80 parts by weight of MHHA; 1.2 parts by weight of DMP-30; and 3.6 parts by weight of gray paste.

The core fiber in each case was acrylic, whereas the glass fiber described in previous examples was used as the shell fiber.

The results of this test are set forth in Table IV.

TABLE IV

| Sample Number 45% HA | 55% HA | Anhydride Epoxide | 45% HA Shot 1 | 2 | 3 | 55% HA Shot 1 | 2 | 3 |
|---|---|---|---|---|---|---|---|---|
| 13 | 14 | 0.91 | ½ | ½ | 3 | 2 | ½ | 3 |
| 15 | 16 | 0.91 | 1 | ½ | ½ | ½ | 3 ½ | 1 ½ |

EXAMPLE 5

A particularly preferred fuse tube in accordance with the invention is constructed as set forth above, and the core resin system contained 75 parts by weight of Epon 828; 25 parts by weight of WC-68; 112 parts by weight ECA 100 h; 1.7 parts by weight of DMP-30; 4.0 parts by weight of gray paste; 270 parts by weight of SB-36CM hydrated alumina; and 1.0 parts by weight of Byk-070. This core resin matrix therefore includes 55.2% by weight hydrated alumina. The preferred organic fiber used with the above described core resin formulation is a 2:1 ratio mixture of polyester and rayon fibers.

The shell resin system used in this example contains 100 parts by weight of Epon 828; 80 parts by weight ECA 100 h; 1.2 parts by weight of DMP-30; and 3.6 parts by weight of gray paste. The shell fiber preferred for use with this shell matrix formulation is Hybon 2063 fiberglass fiber described previously.

EXAMPLE 6

Effect of Anhydride/Epoxide Ratio and Polyester/Rayon Ratio on Cycles to Interrupt and Erosion Rate A series of fuse tubes were evaluated at 7.8 kV and 5000 amps for the number of cycles to interrupt the arc and erosion rate. For these series of tests, the core was formulated with a BPA resin where anhydride/epoxide equivalent ratio in the core was varied from 1.0 to 1.2 and the ratio of polyester fiber to rayon fiber was varied from 3/0 to 0/3.

The results obtained are tabulated in the table below. In this table, the following notations were used:

An/EP=Anhydride/Epoxide Equivalent Ratio in Core

PE/R=Volume Ratio of Polyester Fiber to Rayon Fiber

NI=Did not interrupt the arc

TABLE VI

The Effect of Anhydride/Epoxide Ratio
Reactive Diluent = WC-68 ATH Filler = 55% WT. SB-36

| Sample # | An/EP | PE/R | Cycles to Interrupt Shot 1 | Shot 2 | Shot 3 | Erosion Mils Per ½ Cycle |
|---|---|---|---|---|---|---|
| 58A | 1.0 | 3/0 | NI | NI | — | — |
| 58B | 1.0 | 3/0 | 1 | NI | — | 4.4 |
| 64A | 1.1 | 3/0 | 1 | NI | ½ | 4.3 |
| 64B | 1.1 | 3/0 | NI | NI | — | 3.7 |
| 67A | 1.2 | 3/0 | ½ | ½ | ½ | 2.8 |
| 67B | 1.2 | 3/0 | ½ | NI | ½ | 5.1 |
| 59A | 1.0 | 2/1 | 3 | ½ | 1 | 4.6 |
| 59B | 1.0 | 2/1 | ½ | 3 | ½ | 4.8 |
| 65A | 1.1 | 2/1 | ½ | ½ | ½ | 4.2 |
| 65B | 1.1 | 2/1 | 1 | ½ | ½ | 3.8 |
| 68A | 1.2 | 2/1 | ½ | ½ | ½ | 4.3 |
| 68B | 1.2 | 2/1 | ½ | ½ | ½ | 4.0 |
| 60A | 1.0 | ½ | NI | ½ | NI | — |
| 60B | 1.0 | ½ | ½ | ½ | 1 ½ | 4.6 |
| 66A | 1.1 | ½ | ½ | ½ | ½ | 5.7 |
| 66B | 1.1 | ½ | ½ | ½ | NI | 4.2 |
| 69A | 1.2 | ½ | ½ | ½ | ½ | 4.0 |
| 69B | 1.2 | ½ | ½ | ½ | ½ | 4.2 |
| 71A | 1.0 | 0/3 | ½ | ½ | ½ | 9.8 |
| 71B | 1.0 | 0/3 | ½ | ½ | ½ | 12.8 |

Samples 58, 64 and 67 were made with only polyester fiber in the core. Although there were successful interruptions (within ½ cycle), these samples failed to interrupt in every shot tried. It was demonstrated that successful interruptions occurred as required when an excess amount of anhydride was used (An/EP=1.2:1).

Samples 59, 65 and 68 were made with a polyester fiber/rayon fiber ratio of 2/1. These samples were more effective at interrupting the arc. Again, the samples with an anhydride/epoxide ratio of 1.2:1 performed the best, i.e. all interruptions were successful.

Samples 60, 66 and 69 were made with a polyester fiber/rayon fiber ratio of ½. These samples were all successful except for two interruptions at a normal 1:1 anhydride/epoxide ratio.

Sample 71 was made with all rayon fiber in the core and an anhydride/epoxide ratio of 1:1. All interruptions were successful; however, the erosion rate was quite high compared with the other samples, 9.8 to 12.8 versus 2.8 to 5.7 mils of erosion per ½ cycle.

In view of the higher cost of rayon fiber as compared with polyester, there is an economic advantage to maintain the rayon fiber content as low as possible. With cost as an important factor, the preferred formulation is sample 68 where the polyester fiber/rayon fiber was 2:1 and the anhydride/epoxide ratio was 1.2:1.

I claim:

1. An arc-quenching fuse tube comprising an elongated tubular body having at least the inner wall thereof formed of an arc-quenching material, said material comprising an epoxy resin matrix including an epoxy resin cured in the presence of an anhydride curing agent, the matrix having an anhydride to epoxide equivalent of from about 1.2:1 to 1.4:1; from about 5% to 30% by volume of an organic fiber dispersed in said resin matrix, said organic fiber being characterized by the property of supporting the epoxy during formation of the tube therefrom the having the added function of forming arc-suppressing gaseous products during arcing within the tube; and an inorganic filler making up from about 40% to about 80% by weight of the and capable of generating molecular water under high temperature arcing conditions within the tube for reaction with carbon produced by decomposition of the epoxy resin and the organic fiber by such arcing to release gaseous products which serve to interrupt the arc.

2. The fuse tube of claim 1, said matrix being selected from the group consisting of cycloaliphatic, bis-phenol A epoxy, and mixtures thereof.

3. The fuse tube of claim 1, said organic fiber being selected from the group consisting of fibers of polyester, rayon, acrylic, nylon, cotton and mixtures thereof.

4. The fuse tube of claim 1, said inner wall having about 13% by volume of fiber therein.

5. The fuse tube of claim 1, said matrix further including an amount of filler dispersed therein, said filler being characterized by the property of generating molecular water upon being subjected to arcing conditions within said tube.

6. The fuse tube of claim 1, said filler comprising aluminum trihydrate.

7. The fuse tube of claim 1, said filler being hydrated alumina present in said matrix at a level of about 45% to 70% by weight.

8. The fuse tube of claim 1, said filler being hydrated alumina present in said matrix at a level of about 55% to 60% by weight.

9. The fuse tube of claim 1, said epoxy resin having dispersed therein a reactive diluent, said diluent being selected from the group consisting of butyl glycidyl ether, neopentyl glycol vinyl cyclohexene dioxide and mixtures thereof.

10. The fuse tube of claim 9, said diluent being present at a level of up to about 20% by volume in said matrix.

11. The fuse tube of claim 1, said organic fiber being a mixture of polyester and rayon fibers.

* * * * *

UNITED STATES PATENT AND TRADEMARK OFFICE

CERTIFICATE OF CORRECTION

PATENT NO. : 5,015,514

DATED : May 14, 1991

INVENTOR(S) : William M. Rinehart

It is certified that error appears in the above-indentified patent and that said Letters Patent is hereby corrected as shown below:

On the Title page, item [30], under Foreign Application Priority, insert--

Date: Aug. 18, 1987, USA 07/086,535--.

Signed and Sealed this

Seventeenth Day of August, 1993

Attest:

BRUCE LEHMAN

*Attesting Officer* *Commissioner of Patents and Trademarks*